(12) United States Patent
Yang et al.

(10) Patent No.: US 7,134,864 B2
(45) Date of Patent: Nov. 14, 2006

(54) MOLDING APPARATUS WITH REMOVABLE MOLD CORES

(75) Inventors: Chuan-Hui Yang, Taichung (TW); Ching-Hua Wang, Taichung (TW)

(73) Assignee: Asia Optical Co. Inc., Taichung (TW)

( * ) Notice: Subject to any disclaimer, the term of this patent is extended or adjusted under 35 U.S.C. 154(b) by 79 days.

(21) Appl. No.: 10/837,687

(22) Filed: May 4, 2004

(65) Prior Publication Data

US 2005/0136147 A1 Jun. 23, 2005

(30) Foreign Application Priority Data

Dec. 17, 2003 (TW) .............................. 92135793 A

(51) Int. Cl.
*B29D 11/00* (2006.01)
(52) U.S. Cl. ...................... 425/195; 425/808
(58) Field of Classification Search ............... 425/191, 425/192 R, 193, 195, 808; 249/120, 139
See application file for complete search history.

(56) References Cited

U.S. PATENT DOCUMENTS

| 2,424,235 | A * | 7/1947 | Hoffer ....................... 249/53 R |
| 3,871,611 | A * | 3/1975 | Taketa ........................ 249/102 |
| 6,311,967 | B1 * | 11/2001 | Bickert ....................... 269/287 |
| 6,669,460 | B1 * | 12/2003 | Tai et al. ..................... 425/193 |

* cited by examiner

*Primary Examiner*—Donald Heckenberg
(74) *Attorney, Agent, or Firm*—Banner & Witcoff, Ltd.

(57) ABSTRACT

A molding apparatus for lenses includes first and second molding units. Each of the first and second molding units has a mold core holder, a plurality of mold cores disposed in the mold core holder, and a plurality of fixing elements. The mold core holder has an abutment surface and a plurality of cavities, each of which includes an open end and a positioning portion. Each fixing element engages removably the positioning portion of a respective cavity, and retains a respective mold core in the respective cavity. Individual removal of the mold cores for replacement is permitted by operating the fixing elements.

6 Claims, 4 Drawing Sheets

MOLDING APPARATUS WITH REMOVABLE MOLD CORES

CROSS-REFERENCE TO RELATED APPLICATION

This application claims priority of Taiwanese Application No. 092135793, filed on Dec. 17, 2003.

BACKGROUND OF THE INVENTION

1. Field of the Invention

The invention relates to a molding apparatus for lenses, more particularly to a molding apparatus that has individually removable mold cores for forming lenses.

2. Description of the Related Art

Referring to FIG. 1, a currently available molding apparatus for lenses includes a lower mold unit 1 and an upper mold unit 2 facing the lower mold unit 1. The lower mold unit 1 has a lower mold core holder 101, a plurality of lower mold cores 102 disposed within the lower mold core holder 101, and a lower fixed seat 103 to be fixed to a bottom portion of the lower mold core holder 101 so as to retain the lower mold cores 102 in the lower mold core holder 101. The lower mold core holder 101 is formed with a plurality of lower mold core holes 104, each of which has a narrow upper portion and a wider lower portion. Each of the lower mold cores 102 has a shape corresponding to that of a respective one of the lower mold core holes 104. After the lower mold cores 102 are inserted respectively into the lower mold core holes 104, the lower fixed seat 103 is secured to the bottom portion of the lower mold core holder 101 so that the lower mold cores 102 are retained in the lower mold core holes 104.

The upper mold unit 2 has an upper mold core holder 201, a plurality of upper mold cores 202 disposed within the upper mold core holder 201, and an upper fixed seat 203 to be fixed to a top portion of the upper mold core holder 201 so as to retain the upper mold cores 202 in the upper mold core holder 201. The upper mold core holder 201 is formed with a plurality of upper mold core holes 204, each of which has a narrow lower portion and a wider upper portion. Each of the upper mold cores 202 has a shape corresponding to that of a respective one of the upper mold core holes 204. After the upper mold cores 202 are inserted respectively into the upper mold core holes 204, the upper fixed seat 203 is secured to the top portion of the upper mold core holder 201 so that the upper mold cores 202 are retained in the upper mold core holes 204.

Although the aforementioned molding apparatus can achieve its intended purpose, when inspection of the molded lenses indicates that forming surfaces of some of the lower and upper mold cores 102, 202 are damaged, the defective lower and upper mold cores 102, 202 have to be removed and replaced. To remove the defective lower and upper mold cores 102, 202, the lower and upper fixed seats 103, 203 have to be detached from the bottom and top portions of the lower and upper mold core holders 101, 201, respectively. To remove the lower and upper fixed seats 103, 203 from the lower and upper mold core holders 101, 201, the machine has to be stopped first, and the whole molding apparatus is detached from a machine platform to which the molding apparatus is attached. As such, removal and replacement operations of the defective lower and upper mold cores 102, 202 are not only complicated and time-consuming, but adversely affect the production efficiency as well due to interruption during the molding process.

SUMMARY OF THE INVENTION

Therefore, the object of the present invention is to provide a molding apparatus that has a plurality of mold cores which can be individually and quickly replaced so as to enhance production efficiency.

According to one aspect of this invention, a molding apparatus for lenses comprises a first molding unit and a second molding unit facing the first molding unit. Each of the first and second molding units has a mold core holder and a plurality of mold cores disposed in the mold core holder. The mold core holder has an abutment surface and a plurality of cavities extending inwardly from the abutment surface. The first molding unit further has a plurality of fixing elements. Each of the cavities of the first molding unit includes an open end and a positioning portion proximate to the open end. Each of the fixing elements engages removably the positioning portion of a respective one of the cavities, and retains a respective one of the mold cores of the first molding unit in the respective one of the cavities of the first molding unit. Individual removal of the mold cores of the first molding unit for replacement is permitted by operating the fixing elements.

According to another aspect of this invention, a molding apparatus for lenses comprises a first molding unit and a second molding unit facing the first molding unit. Each of the first and second molding units has a mold core holder, a plurality of mold cores disposed in the mold core holder, and a plurality of fixing elements. The mold core holder has an abutment surface, a plurality of cavities extending inwardly from the abutment surface, and a plurality of positioning portions formed respectively within the cavities proximate to the abutment surface. Each of the cavities includes an open end which has a cross section larger than that of a corresponding one of the mold cores. Each of the mold cores is disposed in a respective one of the cavities through the open end. The fixing elements engage removably and respectively the positioning portions, and retain respectively the mold cores in the cavities. Individual removal of the mold cores for replacement is permitted by operating the fixing elements.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENT

Figure 2:
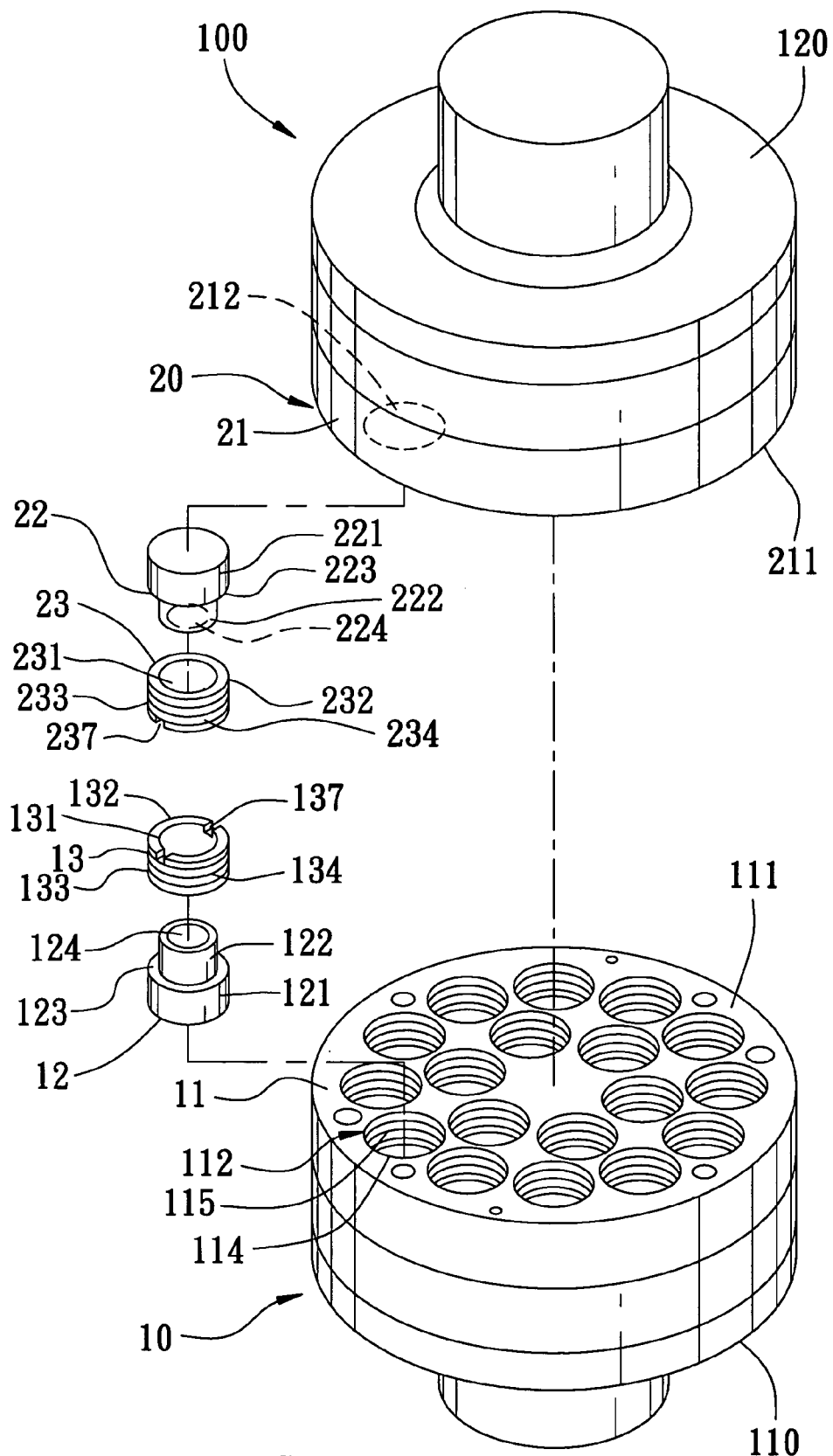
FIG. 2 is an exploded perspective view of the preferred embodiment of a molding apparatus for lenses according to the present invention.
Figure 3:
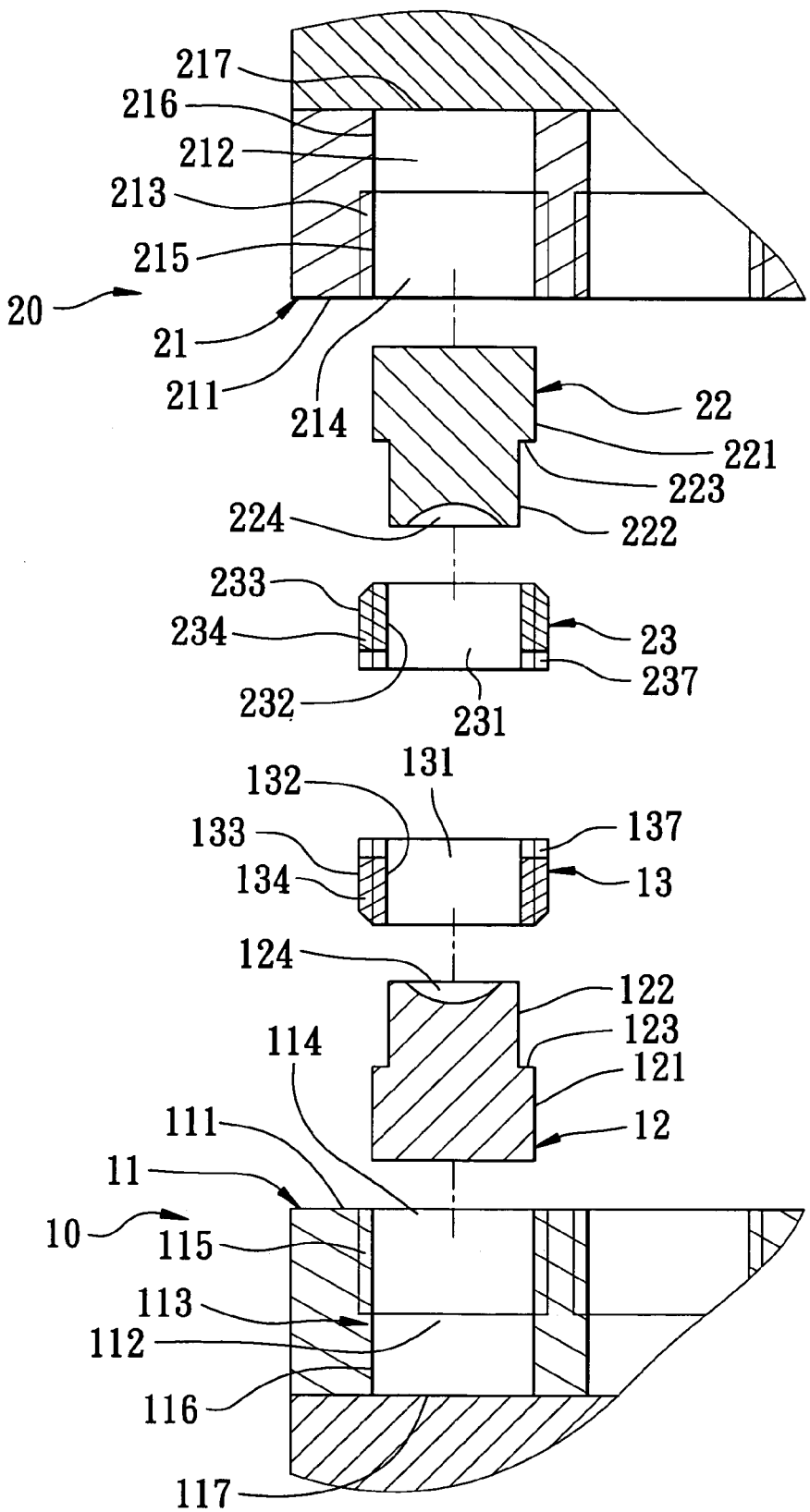
FIG. 3 is a fragmentary schematic sectional view of FIG. 2 in a disassembled state.
Figure 4:
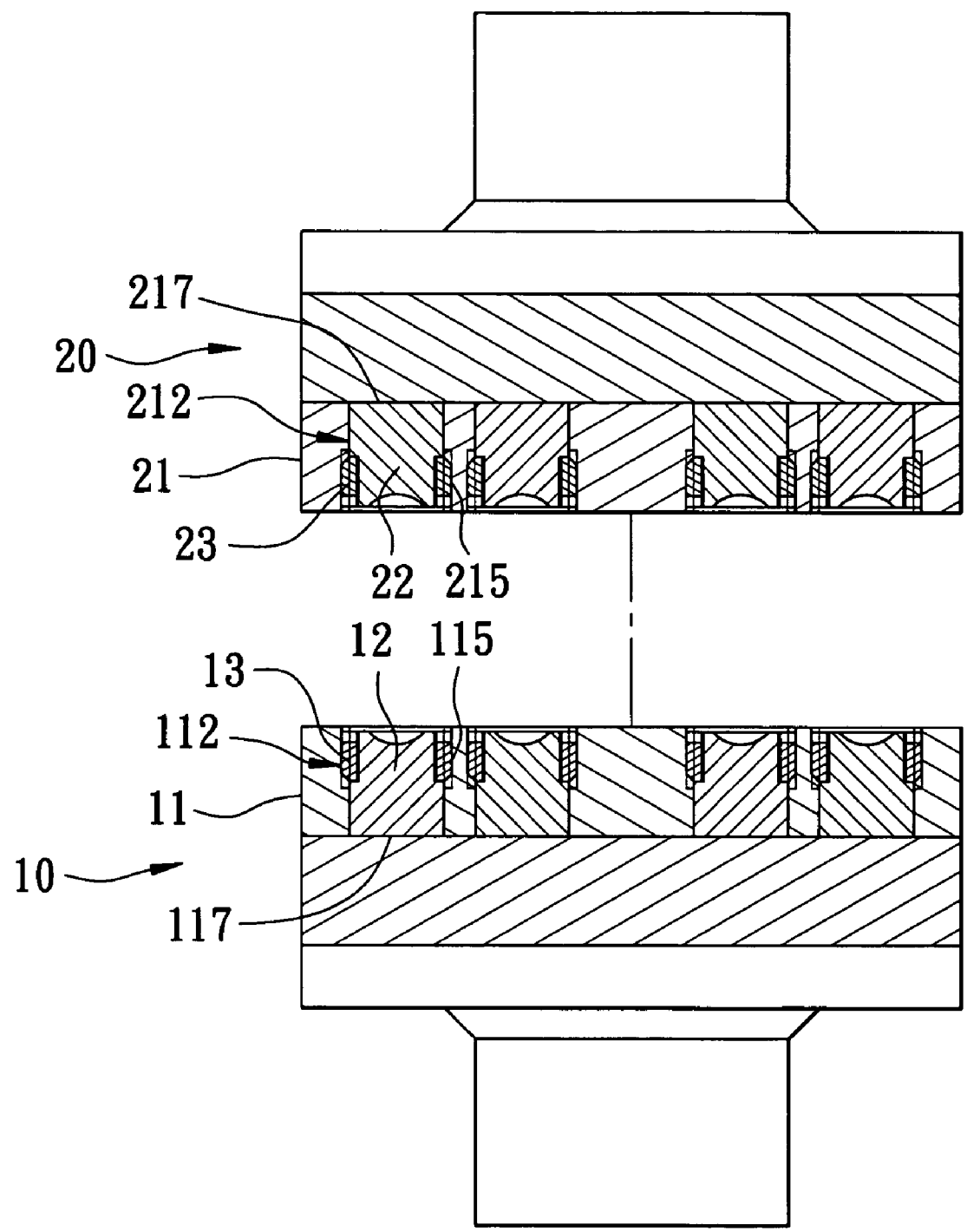
FIG. 4 is a partly sectional schematic view of the preferred embodiment in an assembled state.

Referring to FIGS. 2 to 4, the preferred embodiment of a molding apparatus for lenses according to the present invention is adapted to be mounted on a support assembly 100. The support assembly 100 includes a first support seat 110 and a second support seat 120 confronting the first support seat 110 along an axis. The molding apparatus of the present invention comprises a first molding unit 10 mounted on the first support seat 110, and a second molding unit 20 mounted on the second support seat 120 and facing the first molding unit 10.

Each of the first and second molding units 10, 20 has a mold core holder 11, 21, a plurality of mold cores 12, 22 disposed in the mold core holder 11, 21, and a plurality of fixing elements 13, 23.

The mold core holder 11, 21 has an abutment surface 111, 211, and a plurality of cavities 112, 212 extending inwardly from the abutment surface 111, 211. Each of the cavities 112, 212 includes an open end 114, 214 at the abutment surface 111, 211, and a positioning portion 115, 215 proximate to the open end 114, 214 and having an internal thread. Each cavity 112, 212 is confined by a peripheral wall 113, 213, which extends inwardly from the open end 114, 214, and a supporting face 117, 217 facing the open end 114, 214 and connected to the peripheral wall 113, 213. The positioning portion 115, 215 is formed on the peripheral wall 113, 213 proximate to the abutment surface 111, 211. The peripheral wall 113, 213 has a flat sleeve portion 116, 216 proximate to the supporting face 117, 217 and distal from the abutment surface 111, 211. The open end 114, 214 and the positioning portion 115, 215 have a cross section larger than that of the respective one of the mold cores 12, 22.

Each of the mold cores 12, 22 has a stepped configuration, and is disposed in a respective one of the cavities 112, 212 through the open end 114, 214. Each of the mold cores 12, 22 has a large diameter portion 121, 221 corresponding to the sleeve portion 116, 216 of the respective cavity 112, 212, a small diameter portion 122, 222 fitted within a respective one of the fixing elements 13, 23, a shoulder portion 123, 223 defined between the large and small diameter portions 121, 221, 122, 222, and a forming face 124, 224 formed in the small diameter portion 122, 222. The forming face 124, 224 can be formed as a concave face, a convex face, or a planar face depending on the desired shape of the lens to be formed.

Each of the fixing elements 13, 23 is tubular, and engages removably the positioning portion 115, 215 of a respective one of the cavities 112, 212. Each fixing element 13, 23 has a tubular wall 132, 232. The tubular wall 132, 232 defines a through hole 131, 231, and has an outer periphery 133, 233 and an external thread 134, 234 formed on the outer periphery 133, 233. Each fixing element 13, 23 further has two diametrically opposed grooves 137, 237 formed in the tubular wall 132, 232 thereof proximate to the abutment surface 111, 211.

Referring once again to FIGS. 3 and 4, when the mold cores 12, 22 are inserted into the cavities 112, 212 in the mold core holders 11, 21, and when a tool (not shown) is used to engage the groove 137, 237 in each fixing element 13, 23, each fixing element 13, 23 can be operated to engage threadedly the positioning portion 115, 215 of the respective cavity 112, 212 by means of the external thread 134, 234 of each fixing element 13, 23 and the internal thread of the corresponding positioning portion 115, 215. Therefore, each fixing element 13, 23 is gradually sleeved on the small diameter portion 122, 222 of the corresponding mold core 12, 22 until each fixing element 13, 23 abuts against the shoulder portion 123, 223 of the corresponding mold core 12, 22, and presses the corresponding mold core 12, 22 to result in tight contact with the supporting face 117, 217 of the respective cavity 112, 212, thereby retaining the corresponding mold core 12, 22 in the latter.

When one of the mold cores 12, 22 is damaged or defective, it is not necessary to remove the first and second molding units 10, 20 from the first and second support seats 110, 120. Particularly, a tool (not shown) is used to operate and remove the corresponding fixing element 13, 23 from the corresponding cavity 112, 212. After removing the damaged or defective mold core 12, 22 from the corresponding cavity 112, 212, it can be replaced with a new one. After replacement, the corresponding fixing element 13, 23 is once again threaded to the positioning portion 115, 215 of the corresponding cavity 112, 212 using the same tool.

Therefore, the molding apparatus of the present invention does not require removal of the whole apparatus from the support assembly 100 to replace defective mold cores 12, 22. By simply operating the fixing elements 13, 23, the defective mold cores 12, 22 can be easily and quickly replaced. As such, not only is the replacement time reduced, the effect on the operation of the molding apparatus to form lenses is minimized as well so that the lens forming operation can be run smoothly, thereby enhancing the production efficiency.

It should be noted that since the fixing elements 13, 23 are tubular, they occupy only a small area of the mold core holders 11, 21. Therefore, the fixing elements 13, 23 permit quick assembly and disassembly of mold cores without reducing the number of the cavities of the molding apparatus.

Figure 1:
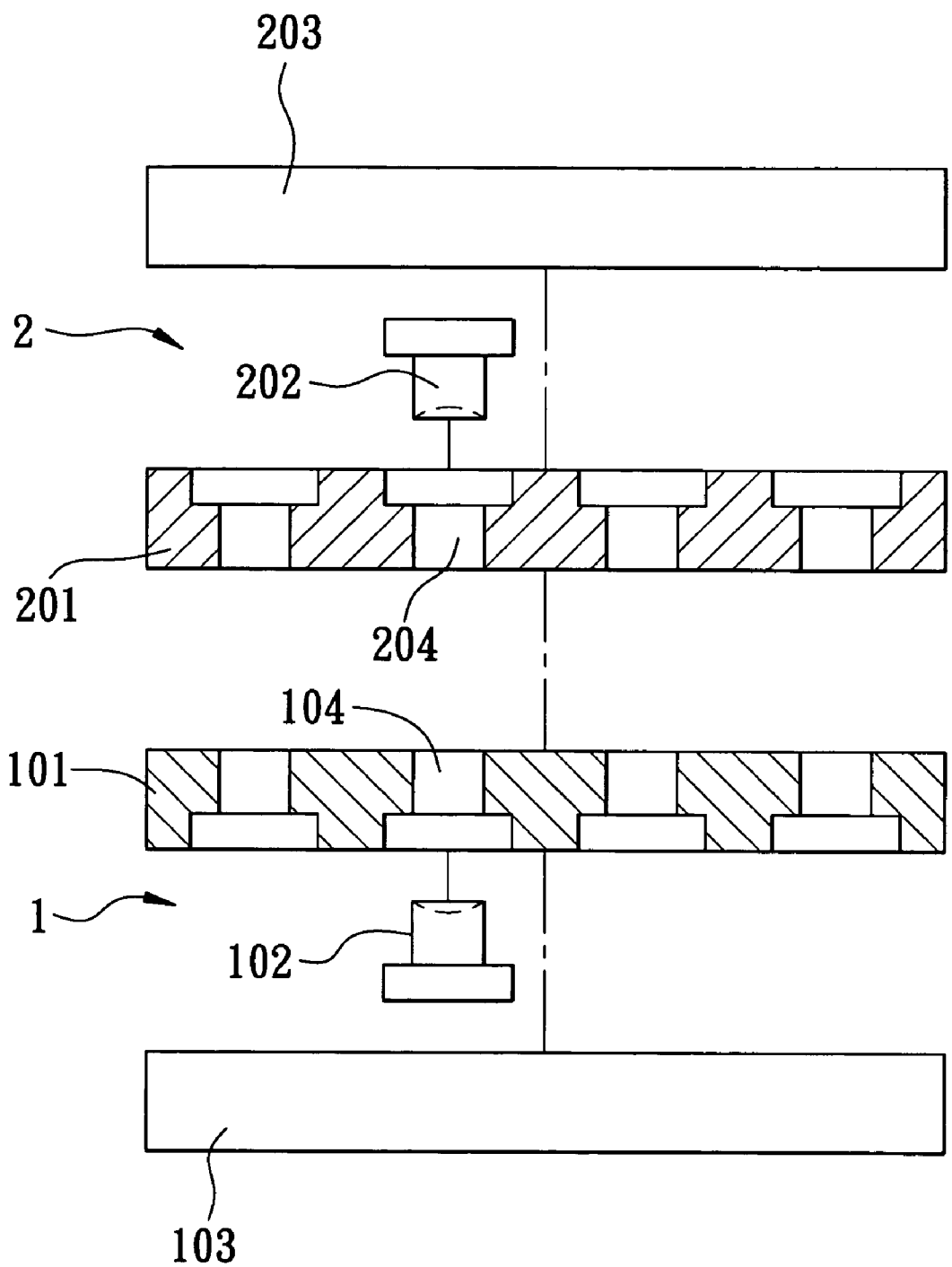
FIG. 1 is a partly sectional exploded schematic view of a currently available molding apparatus for lenses.

Apart from the embodiment as described above, the first molding unit 10 of the present invention can be used in conjunction with the upper mold unit 2 of the conventional molding apparatus shown in FIG. 1, and the second molding unit 20 of the present invention can be used in conjunction with the lower mold unit 1 of the conventional molding apparatus shown in FIG. 1. The aforementioned advantage of quick replacement can be similarly achieved.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A molding apparatus for lenses, comprising:
   a first molding unit; and
   a second molding unit facing said first molding unit;
   each of said first and second molding units having a mold core holder and a plurality of mold cores disposed in said mold core holder, said mold core holder having an abutment surface and a plurality of cavities extending inwardly from said abutment surface;
   wherein said first molding unit further has a plurality of fixing elements, each of said cavities of said first molding unit including an open end and a positioning portion proximate to said open end, each of said fixing elements engaging removably said positioning portion of a respective one of said cavities and retaining a respective one of said mold cores of said first molding unit in the respective one of said cavities of said first molding unit;
   whereby individual removal of said mold cores of said first molding unit for replacement is permitted by operating said fixing elements;
   wherein said open end of each of said cavities of said first molding unit is ended at said abutment surface of said first molding unit, said open end and said positioning portion having a cross section larger than that of the respective one of said mold cores of said first molding unit, each of said mold cores of said first molding unit being put in the respective one of said cavities of said first molding unit through said open end;

wherein each of said cavities of said first molding unit is confined by a peripheral wall which extends inwardly from said open end, and a supporting face facing said open end and connected to said peripheral wall, said peripheral wall having a sleeve portion proximate to said supporting face, said positioning portion being formed on said peripheral wall proximate to said abutment surface of said first molding unit; and wherein said fixing elements are tubular, each of said fixing elements having a tubular wall with an outer periphery and an external thread formed on said outer periphery, said positioning portion having an internal thread that engages said external thread.

2. The molding apparatus as claimed in claim 1, wherein each of said mold cores of said first molding unit has a stepped configuration, each of said mold cores of said first molding unit further having a large diameter portion received in said sleeve portion, a small diameter section fitted within the respective one of said fixing elements, and a shoulder portion defined between said large and small diameter portions, each of said fixing elements abutting against said shoulder portion when engaging said positioning portion.

3. The molding apparatus as claimed in claim 1, wherein each of said fixing elements further has at least two diametrically opposed grooves formed in said tubular wall thereof proximate to said abutment surface of said first molding unit.

4. A molding apparatus for lenses, comprising:
a first molding unit; and
a second molding unit facing said first molding unit;
each of said first and second molding units having a mold core holder, a plurality of mold cores disposed in said mold core holder, and a plurality of fixing elements, said mold core holder having an abutment surface, a plurality of cavities extending inwardly from said abutment surface, and a plurality of positioning portions formed respectively within said cavities proximate to said abutment surface, each of said cavities including an open end which has a cross section larger than that of a corresponding one of said mold cores, each of said mold cores being disposed in a respective one of said cavities through said open end, said fixing elements engaging removably and respectively said positioning portions and retaining respectively said mold cores in said cavities;

whereby individual removal of said mold cores for replacement is permitted by operating said fixing elements;

wherein each of said cavities is confined by a peripheral wall, which extends inwardly from said open end, and a supporting face facing said open end and connected to said peripheral wall, said peripheral wall having a sleeve portion proximate to said supporting face, said positioning portion being formed on said peripheral wall proximate to said abutment surface; and wherein said fixing elements are tubular, each of said fixing elements having a tubular wall with an outer periphery and an external thread formed on said outer periphery, each of said positioning portions having an internal thread that engages said external thread.

5. The molding apparatus as claimed in claim 4, wherein each of said mold cores has a stepped configuration, each of said mold cores further having a large diameter portion received in said sleeve portion, a small diameter section fitted within the respective one of said fixing elements, and a shoulder portion defined between said large and small diameter portions, each of said fixing elements abutting against said shoulder portion when engaging a respective one of said positioning portions.

6. The molding apparatus as claimed in claim 4, wherein each of said fixing elements further has at least two diametrically opposed grooves formed in said tubular wall thereof proximate to said abutment surface.

* * * * *